(12) United States Patent
De Kievit

(10) Patent No.: US 12,327,267 B2
(45) Date of Patent: Jun. 10, 2025

(54) INFORMATION PROCESSING APPARATUS AND INFORMATION PROCESSING METHOD

(71) Applicant: RAKUTEN GROUP, INC., Tokyo (JP)

(72) Inventor: Sander De Kievit, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 17/776,821

(22) PCT Filed: Jul. 30, 2021

(86) PCT No.: PCT/JP2021/028463
§ 371 (c)(1),
(2) Date: May 13, 2022

(87) PCT Pub. No.: WO2023/007732
PCT Pub. Date: Feb. 2, 2023

(65) Prior Publication Data
US 2024/0161148 A1    May 16, 2024

(51) Int. Cl.
*G06Q 30/0226* (2023.01)
*H04W 4/029* (2018.01)

(52) U.S. Cl.
CPC ........ *G06Q 30/0226* (2013.01); *H04W 4/029* (2018.02)

(58) Field of Classification Search
CPC .... G06Q 30/0226; G06Q 30/02; H04W 4/029
See application file for complete search history.

(56) References Cited

U.S. PATENT DOCUMENTS

| | | | |
|---|---|---|---|
| 8,046,256 B2 * | 10/2011 | Chien | G06Q 30/0215 705/14.33 |
| 2004/0198395 A1 * | 10/2004 | Kimoto | H04L 67/52 455/456.3 |

(Continued)

FOREIGN PATENT DOCUMENTS

| | | |
|---|---|---|
| JP | 2014-044724 A | 3/2014 |
| WO | 2019/230986 A1 | 12/2019 |

OTHER PUBLICATIONS

A New Card-Linked Loyalty Program: Estimated and Anticipated Benefits for Payment Transaction Parties Albert Sitek and Zbigniew Kotulski (Year: 2020).*

*Primary Examiner* — Alexandru Cirnu
(74) *Attorney, Agent, or Firm* — Sughrue Mion, PLLC

(57) ABSTRACT

Disclosed herein is an information processing apparatus, comprising: a position detection unit configured to detect a position of the information processing apparatus; a point card selection unit configured to select, from a plurality of point cards stored in advance in the information processing apparatus, point cards associated with the position of the information processing apparatus detected by the position detection unit; a controller unit configured to control processing by the position detection unit and the point card selection unit to periodically repeat; a payment detection unit configured to detect payment associated with the information processing apparatus; and an output unit configured to output a list of the point cards selected by the point card selection unit, triggered by the payment detected by the payment detection unit.

6 Claims, 9 Drawing Sheets

(56) References Cited

U.S. PATENT DOCUMENTS

| | | | |
|---|---|---|---|
| 2009/0037326 A1 | 2/2009 | Chitti et al. | |
| 2010/0082487 A1* | 4/2010 | Nelsen | G06Q 20/351 |
| | | | 705/44 |
| 2010/0174589 A1* | 7/2010 | Asai | G06Q 30/0229 |
| | | | 705/14.27 |
| 2010/0325202 A1* | 12/2010 | Rehtijarvi | H04L 67/303 |
| | | | 709/203 |
| 2011/0060652 A1* | 3/2011 | Morton | H04L 67/02 |
| | | | 705/14.58 |
| 2014/0058941 A1 | 2/2014 | Moon et al. | |
| 2014/0249904 A1 | 9/2014 | Nelsen et al. | |
| 2015/0106218 A1 | 4/2015 | Moon et al. | |
| 2019/0220845 A1 | 7/2019 | Moon et al. | |
| 2019/0378143 A1* | 12/2019 | Volpi | G06Q 30/02 |
| 2020/0042978 A1 | 2/2020 | Moon et al. | |
| 2020/0273019 A1 | 8/2020 | Moon et al. | |
| 2020/0380496 A1 | 12/2020 | Moon et al. | |

\* cited by examiner

FIG. 6

|  | 61 |
|---|---|
| STORE NAME | POINT CARD NAME |
| Seven Eleven | Nanaco |
| Lawson | Ponta |

"Seven Eleven" →

FIG. 7

|  | 71 |
|---|---|
| SSID | POINT CARD NAME |
| SevenEleven_Free_Wifi | Nanaco |
| SevenEleven_Free_Wifi | Rakupoints |
| Lawson_Guest_Wifi | Ponta |

FIG. 8A

| SSID | POINT CARD NAME | COUNTER |
|------|-----------------|---------|
|      |                 |         |

| SSID | POINT CARD NAME | COUNTER |
|------|-----------------|---------|
| SevenEleven | Nanaco | 1 |

| SSID | POINT CARD NAME | COUNTER |
|------|-----------------|---------|
| SevenEleven | Nanaco | 15 |
| SevenEleven | Rakupoints | 10 |
| SevenEleven | Ponta | 1 |
| SevenEleven | Starbucks | 5 |
| Starbucks | Rakupoints | 25 |
| Starbucks | Starbucks | 5 |
| Lawson | Ponta | 35 |

83

"Seven Eleven"

INFORMATION PROCESSING APPARATUS AND INFORMATION PROCESSING METHOD

CROSS REFERENCE TO RELATED APPLICATIONS

This application is a National Stage of International Application No. PCT/JP2021/028463 filed Jul. 30, 2021.

TECHNICAL FIELD

The present invention relates to an information processing apparatus, an information processing method, and a program thereof, and in particular to a technique for making digitized point cards available on a mobile device.

BACKGROUND ART

Most of business operators that operate retail stores providing goods or services offer point card services with the aim of attracting and retaining customers. The point card service is an ancillary service in which a business operator operating a store gives points to a point card issued to customers based on the amount of purchases of goods or services made by the customers and the number of times the customers visit the store.

When the customers revisit the store, the customers are able to get discounts on purchases and various other benefits in exchange for the points accumulated on their point cards. The advantage for the store is that the store can attract more customers and understand the preferences of the customers.

Since point cards are essentially provided to customers by the business operators of stores in order to differentiate a certain store from other stores, in many cases different point cards are provided for different stores or store chains. As a result, the number of point cards kept by a customer continues to increase with the customer's consumption behavior, making it difficult for a customer to carry all of his or her point cards. Customers are disadvantaged in that the customers miss the opportunity to enjoy the benefits they would have had if they had carried their point cards.

In recent years, many point cards have been digitized and stored in mobile devices such as smartphones, and are made available via the wallet functions or applications of the mobile devices. Such digitized point cards are able to save customers the trouble of carrying them around.

On the other hand, storing a large number of point cards in a mobile device inevitably consumes the limited storage capacity of the mobile device and slows down the time it takes to load and make the point cards available. Furthermore, overcrowding the digital wallet of a mobile device with a large number of point cards makes it difficult to expeditiously search on the mobile device for a particular point card that is intended to be used in a particular store, thus compromising customer convenience.

Patent Literature 1 discloses a method in which a user provides payment information to a peer device using an image on a display of the user's device.

More particularly, the device disclosed in Patent Literature 1 identifies a member store at which the device is located using at least one of a GPS (Global Positioning System) value or an AP (Access Point) value. The device disclosed in Patent Literature 1 further uses at least one of payment card information, card benefit information, and card payment history, determines payment cards that are available for payment in the environment of the identified member store, and lists the card images of the determined payment cards as a card recommendation list on the device. When a user touches a card image of a given payment card from the card recommendation list displayed on the device, the payment information corresponding to the touched card image is transmitted to the peer device.

LISTING OF REFERENCES

Patent Literature

PATENT LITERATURE 1: Laid-open Publication of Japanese Patent Application No. 2014-44724 A

SUMMARY OF THE INVENTION

Problems to be Solved by the Invention

However, the number of point cards owned by a customer is usually much larger than the number of available payment cards. For this reason, even when the card images of a large number of point cards are listed on a display screen of a mobile device, it is not straightforwardly easy for users to expeditiously search for the desired point card.

Furthermore, since positioning information such as the GPS usually has an error of several meters to several tens of meters, it is difficult to identify a store simply from the positioning information. Especially when strolling in a large commercial facility with multiple floors, such as a shopping mall, it is practically impossible to automatically select a point card that is available in a certain store based on the position of the mobile device being acquired.

The present invention has been made in order to solve the above mentioned problems and an object thereof is to provide an information processing apparatus, an information processing method, and a program thereof capable of presenting an available point card from a large number of digitized point cards stored in a mobile device more expeditiously and automatically.

Solution to Problems

In order to solve the above mentioned problems, according to one aspect of the present invention, there is provided an information processing apparatus, comprising: a position detection unit configured to detect a position of the information processing apparatus; a point card selection unit configured to select, from a plurality of point cards stored in advance in the information processing apparatus, point cards associated with the position of the information processing apparatus detected by the position detection unit; a controller unit configured to control processing by the position detection unit and the point card selection unit to periodically repeat; a payment detection unit configured to detect payment associated with the information processing apparatus; and an output unit configured to output a list of the point cards selected by the point card selection unit, triggered by the payment detected by the payment detection unit.

The position detection unit may detect the position of the information processing apparatus based on one or more of a cell ID distributed from a base station of a mobile network, radio waves transmitted from a GPS (Global Positioning System) satellite, and an identifier of an access point broadcast from the access point of a wireless network.

The position detection unit may detect an SSID (Service Set Identifier) broadcast from a Wi-Fi access point, and the point card selection unit may select, when the SSID detected by the position detection unit is switched, a point card associated with a destination SSID to be switched.

The position detection unit may detect the cell ID distributed from the base station, and the point card selection unit may select, when the cell ID detected by the position detection unit is switched, a point card associated with a destination cell ID to be switched.

The output unit may output a list of point cards associated with the payment detected by the payment detection unit from among the point cards selected by the point card selection unit.

The information processing apparatus may further comprise: a sorting unit configured to determine a priority of each of the point cards selected by the point card selection unit based on a point transaction history of the point cards, sorts the selected point cards in order of the determined priority, and supplies the sorted point cards to the output unit.

The information processing apparatus may further comprise: a user interface configured to receive input for assigning the priority to at least one of the plurality of point cards stored in advance in the information processing apparatus, and the sorting unit may sort the selected point cards in order of the priority input via the user interface.

The payment detection unit may receive a message indicating a completion of payment sent from an external device connected to the information processing unit via a network, and the output unit may output the list of the point cards selected by the point card selection unit, triggered by the message received by the payment detection unit.

According to another aspect of the present invention, there is provided an information processing method performed by an information processing apparatus, comprising steps of: detecting a position of the information processing apparatus; selecting, from a plurality of point cards stored in the information processing unit in advance, point cards associated with the detected position of the information processing apparatus; controlling processing of detecting the position and selecting the point cards to periodically repeat; detecting payment associated with the information processing apparatus; and outputting a list of the selected point cards, triggered by the detected payment.

According to yet another aspect of the present invention, there is provided an information processing program for causing a computer to execute information processing, the program causing the computer to execute processing comprising: a position detection process for detecting a position of the information processing apparatus; a point card selection process for selecting, from a plurality of point cards stored in advance in the information processing apparatus, point cards associated with the position of the information processing apparatus detected by the position detection process; a controlling process for controlling processing by the position detection process and the point card selection process to periodically repeat; a payment detection process for detecting payment associated with the information processing apparatus; and an output process for outputting a list of the point cards selected by the point card selection process, triggered by the payment detected by the payment detection process.

Advantageous Effect of the Invention

According to the present invention, it makes it possible to present an available point card from a large number of digitized point cards stored in a mobile device more expeditiously and automatically.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 6 is a schematic diagram illustrating an exemplary configuration of a mapping table between store names and point card names referred to by the point card management apparatus.

FIG. 7 is a schematic diagram illustrating an exemplary configuration of another mapping table between SSIDs and the point card names referred to by the point card management apparatus.

FIG. 8A is a schematic diagram illustrating an initial state of the mapping table during a procedure for generating the mapping table between the SSIDs and the point card names of FIG. 7 by the point card management apparatus.

FIG. 8B is a schematic diagram illustrating a data input state of the mapping table of FIG. 8A after the point card is used once.

FIG. 8C is a schematic diagram illustrating a data input state of the mapping table of FIG. 8B after the point card is used x-times.

DESCRIPTION OF EMBODIMENTS

Figure 1:
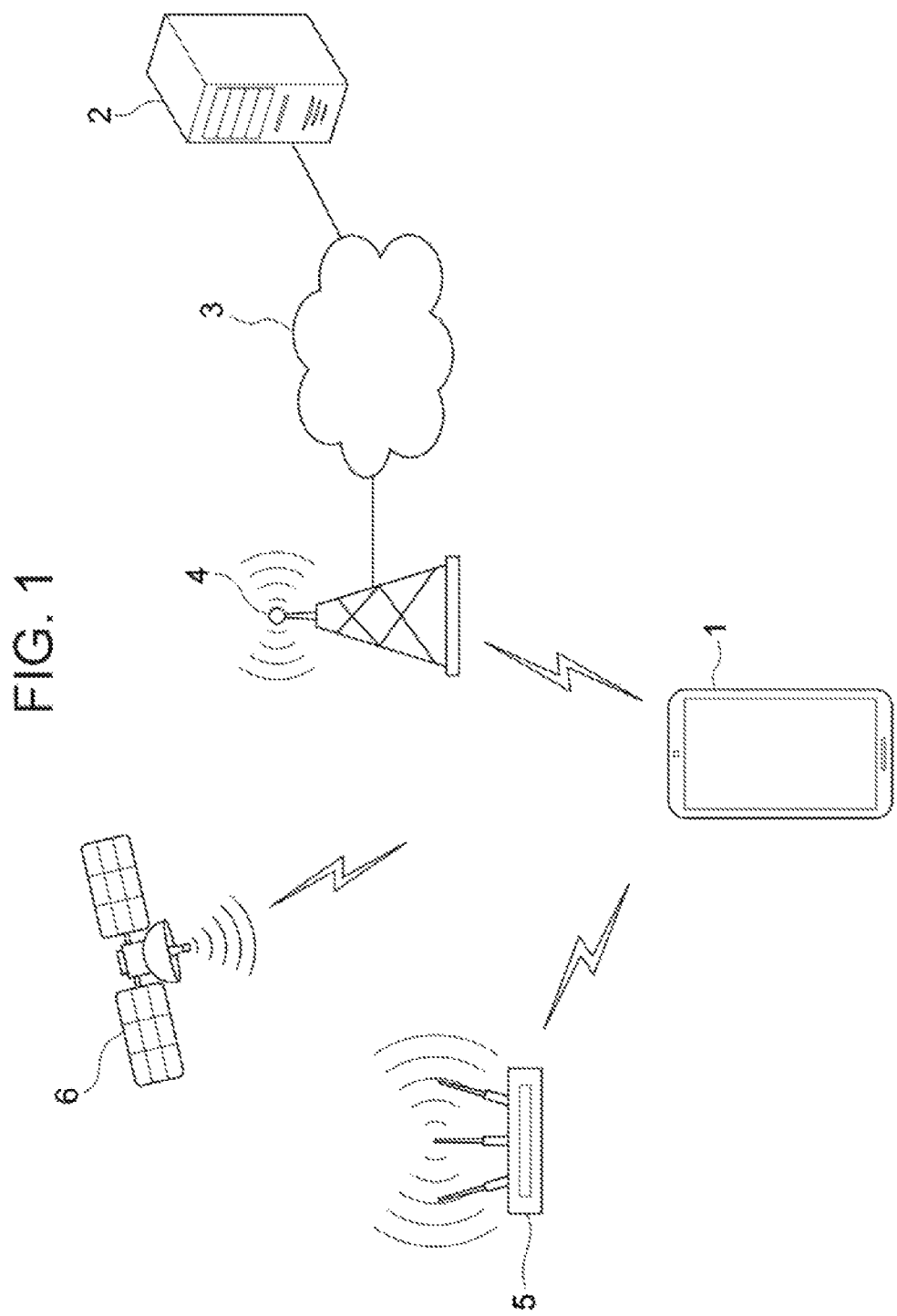
FIG. 1 is a conceptual diagram illustrating an exemplary network configuration of a network system including a point card management apparatus according to the present embodiments of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a point card management apparatus according to the present embodiment is implemented in a mobile device carried by a user, for example, a smartphone, digitizes a plurality of point cards (i.e., loyalty cards or rewards cards, hereinafter referred to as "point cards") issued to the user and stores the digitized point cards in a storage device, pre-selects, from a plurality of digitized point cards, point cards that can be used in the environment in which the mobile device is located based on the position of the mobile device, the preferences of the user, and the payment status, or the like, and outputs a list of the pre-selected point cards to a display screen, triggered by the user making a payment for the purchase of goods or services so as to make the listed point cards available to the user.

However, the present embodiment is not limited to thereto. For example, the point card management apparatus according to the present embodiment may periodically output the list of pre-selected point cards to the display screen, or alternatively output the list to the display screen when a new point card is pre-selected.

All or a part of functions and configuration of the point card management apparatus according to the present embodiment may be implemented in another mobile device that is capable of communicating with the mobile device carried by a user via the short-distance communication. Alternatively, all or a part of the functions and configuration of the point card management apparatus according to the present embodiment may be implemented in any server device that is capable of communicating with the mobile device carried by a user via a mobile network.

<Network Configuration of System including Point Card Management Apparatus>

FIG. 1 is a conceptual diagram illustrating an exemplary network configuration of a network system including a point card management apparatus according to the present embodiment.

The network system shown in FIG. 1 includes a mobile device 1, a server device 2, a mobile network 3, a base station 4, and a Wi-Fi access point 5.

The mobile device 1 is a mobile terminal that can be carried by a user and implements all or a part of the functions and configuration of the point card management apparatus according to the present embodiment. Although FIG. 1 shows an example of the mobile device 1 being a smartphone, the mobile device 1 may be constituted with any computer, such as a tablet terminal, a smartwatch, a multi-functional music player, a wearable terminal, or the like.

The mobile device 1 is capable of communicating with the server device 2 and other server devices of other business operators such as banks via the base station 4 and the mobile network 3. The mobile device 1 is also capable of communicating with the server device 2 and other server devices of other business operators via the Wi-Fi (Wireless Fidelity: registered trademark) access point 5 and networks. The mobile device 1 is yet also capable of communicating with a Point of Sales (POS) terminal installed in a store via various short-range communication networks.

The network that can be used by the mobile device 1 according to the present embodiment includes a wireless LAN (Local Area Network) such as Wi-Fi, a wireless PAN (Personal Area Network) such as Bluetooth (registered trademark), ZigBee (registered trademark), and UWB (Ultra Wide Band), and wireless MAN (Metropolitan Area Network) such as WiMAX (registered trademark). In addition, the network that can be used by the mobile device 1 according to the present embodiment includes wireless WAN (Wide Area Network) such as LTE/3G, 4G, 5G, and the like. It should be noted that any network can be used as long as the network is capable of connecting respective devices to each other and making the communication therebetween available, and the standard, scale, and configuration of the communication are not limited to the above.

The mobile device 1 acquires information indicating the position of the mobile device 1 from at least one of the base station 4, the Wi-Fi access point 5, and a GPS (Global Positioning System) satellite 6 shown in FIG. 1.

More particularly, the mobile device 1 transmits and receives radio signals to and from the base station 4 and receives a cell ID (CID) that identifies each sector (i.e., cell) of the base station 4, which is distributed from the base station 4, as information indicating the position of the mobile device 1.

When the mobile device 1 moves and crosses the boundary of the cell of the base station 4 with which the mobile device 1 is in wireless communication and moves into the cell of a destination base station 4, the handover is performed and the mobile device 1 continues the wireless communication with the destination base station 4. When the handover is performed, the cell ID received by the mobile device 1 is switched from a cell ID of the source base station 4 to a cell ID of the destination base station 4.

The mobile device 1 also receives wireless LAN radio signals (i.e., beacons) broadcast from the Wi-Fi access point 5, and receives, from the Wi-Fi access point 5, the SSID (Service Set Identifier) that identifies the Wi-Fi access point 5, which is carried by the beacons, as the information indicating the position of the mobile device 1.

When the mobile device 1 moves and crosses the boundary of the beacon reception area from the Wi-Fi access point 5 and moves into the beacon reception area of another Wi-Fi access point 5, the mobile device 1 continues the wireless LAN communication via the destination Wi-Fi access point 5. At this time, the SSID received by the mobile device 1 is switched from an SSID of the source Wi-Fi access point 5 to an SSID of the destination Wi-Fi access point 5.

The mobile device 1 further receives positioning information of the GPS satellite 6, which is transmitted by radio waves from the GPS satellite 6, and the time when the radio waves containing the positioning information is transmitted, measures the current position (i.e., latitude and longitude) of the mobile device 1 based on the received positioning information of the GPS satellite 6 and the transmission time, and acquires the measured position of the mobile device 1 as the information indicating the position of the mobile device 1 (hereinafter also referred to as "positional information").

The mobile device 1 performs measuring of the mobile device 1 sequentially, and as the mobile device 1 moves, the measured positional information of the mobile device 1 is also updated sequentially.

The server device 2 is connected to the mobile device 1 via the base station 4 and the mobile network 3 or via the Wi-Fi access point 5 and its network, and serves as a device that bears all or a part of the configuration and functions of the point card management apparatus according to the present embodiment. In particular, the server device 2 may hold and maintain a table that maps information indicating the position of the mobile device 1 to the name of the store or the name of the point card, the usage history of the point card for each user or each mobile device 1 (i.e., the history of point transactions), and information about the user's preferences or priorities for using the point card.

The server device 2 may be commonly operated among a large number of stores to collectively perform pre-selection and point transaction processing for a large number of point cards that can be used in a large number of stores, respectively. The server device 2 may also be constituted as a proxy server that performs the Internet access of the mobile device 1 on its behalf.

The mobile network 3 relays the communication via the base station 4 between the mobile device 1 and the back-end Internet. The mobile network 3 may be either a 4G network or a 5G network, or any other generation of the mobile communication system.

Alternatively, the mobile device 1 may use, instead of the mobile network 3, the Wi-Fi access point 5 and any wireless or wired network to perform communication with the back-end Internet.

The base station 4 is equipped with an antenna, a Remote Radio Head (RRH), a Radio Interface Unit (RIU), which is a line terminating device, and the like, and transmits and receives radio signals to and from the mobile device 1 via the antenna of the base station 4.

The base station 4 serves as an edge node that constitutes the Radio Access Network (RAN) of the mobile network 3. The base station 4 receives attach requests from the mobile device 1, connects the mobile device 1 to the core network via the fronthaul network and the backhaul network, and relays data transfer and voice calls between the mobile device 1 and the Internet.

The base station 4 broadcasts the cell ID within the cell of the base station 4. The cell ID may be assigned differently for each of sectors (cells) of the base station 4 or for each frequency band.

The Wi-Fi access point 5 is a master device that transmits and receives radio waves of Wi-Fi, which is a wireless LAN, and connects the mobile device 1 to Wi-Fi. The Wi-Fi access point 5 may be implemented in, for example, a router, and broadcasts an SSID, which is a unique string of characters to identify the access point, within the area of the Wi-Fi access point 5. The SSID may be an Extended SSID (ESSID) or a Basic SSID (BSSID). Also, a single Wi-Fi access point 5 may have a plurality of SSIDs.

The GPS satellite 6 is an artificial satellite used in the GPS, and orbits the earth while transmitting orbital information and time information that indicates the position of the GPS satellite.

It should be note that the number of mobile devices 1, server devices 2, base stations 4, and Wi-Fi access points 5 is not limited to the number shown in FIG. 1, and each of them may be multiple.

<Functional Configuration of Point Card Management Apparatus>

Figure 2:
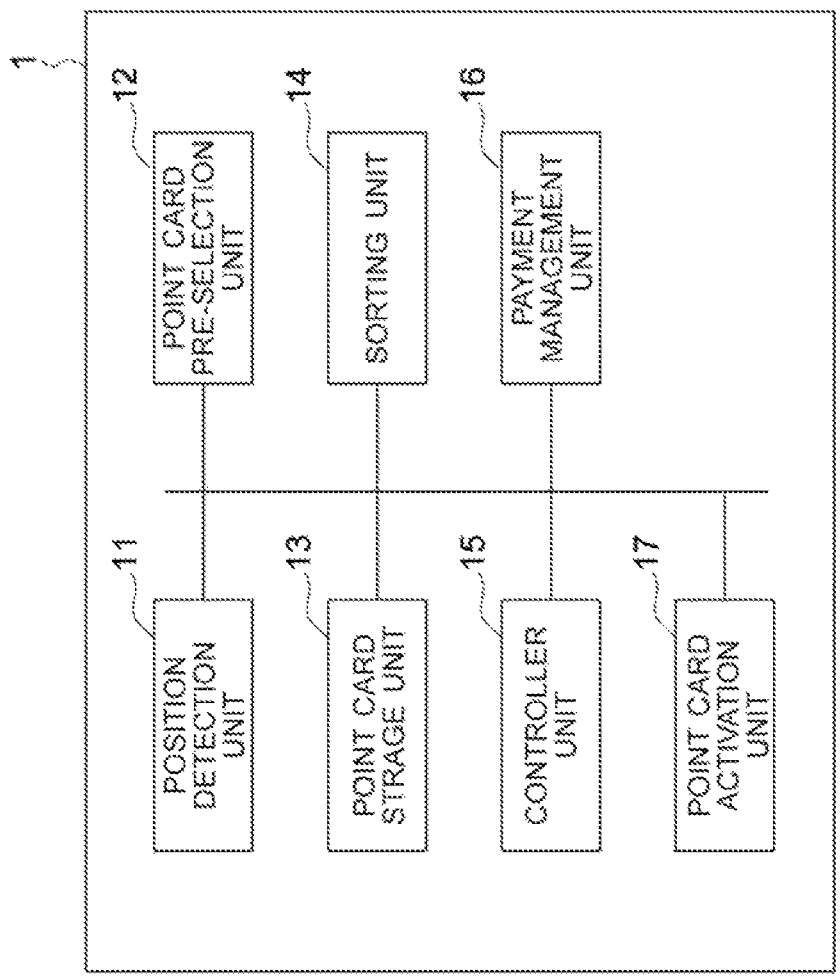
FIG. 2 is a block diagram illustrating an exemplary functional configuration of the point card management apparatus according to a first embodiment.

FIG. 2 is a block diagram illustrating an exemplary functional configuration of the point card management apparatus 1 according to the first embodiment.

Among the functional modules of the point card management apparatus 1 shown in FIG. 2, as for the functions that are implemented by software, those functions may be implemented by storing the program to provide the functions of each functional module in a ROM or any other memories, and allowing a CPU or any other circuitries to read the programs into a RAM to execute the programs. As for the functions that are implemented in hardware, for example, a dedicated circuit may be automatically generated on a Field Programmable Gate Array (FPGA) from the programs to provide the function of respective function modules by using a predetermined compiler. Alternatively, it is also possible to form a Gate Array circuit in the same way as the FPGA and implement it by hardware. Yet alternatively, those functions may be implemented an Application Specific Integrated Circuit (ASIC). The configuration of the functional blocks shown in FIG. 2 is no more than an example, and multiple functional blocks may constitute a single functional block, or any of the functional blocks may be divided into blocks that perform multiple functions.

Referring to FIG. 2, the point card management apparatus 1, which may be a mobile device, includes a position detection unit 11, a point card pre-selection unit 12, a point card storage unit 13, a sorting unit 14, a controller unit 15, a payment management unit 16, and a point card activation unit 17.

The position detection unit 11 detects information indicating the position of the mobile device 1 and supplies the detected information indicating the position of the mobile device 1 to the point card pre-selection unit 12 and the controller unit 15.

More particularly, the position detection unit 11 receives the cell IDs broadcast from the base station 4, or the SSIDs broadcast from the Wi-Fi access point 5, and detects one or more of those received cell IDs or SSIDs as the information indicating the position of the mobile device 1.

Alternatively, the position detection unit 11 may receive, from the GPS satellite 6, the positioning information of the GPS satellite 6 and the time when the radio wave containing the positioning information is transmitted from the GPS satellite 6, measure the position of the mobile device 1 based on the received positioning information of the GPS satellite 6 and the transmission time, and detects, as the information indicating the position of the mobile device 1, the measured position of the mobile device 1 (i.e., latitude and longitude).

The point card pre-selection unit 12 maps the information indicating the position of the mobile device 1, which is supplied by the position detection unit 11, to one or more point cards, pre-selects mapped one or more point cards from the information indicating the position of the mobile device 1, and generates a list of one or more pre-selected point cards.

More particularly, the point card pre-selection unit 12 acquires the information indicating the position of the mobile device 1, maps the acquired position of the mobile device 1 to a point card that is associated with the location, and pre-selects the point card by retrieving information of the mapped point card from the point card storage unit 13.

Alternatively, the point card pre-selection unit 12 may acquire the information indicating the position of the mobile device 1, and map the acquired position of the mobile device 1 to a store name that is associated with the acquired position (or an identifier of the store). In this case, the point card pre-selection unit 12 may further map the mapped store name to a point card corresponding to the store name, and retrieve information of the mapped point card from the point card storage unit 13.

According to the present embodiment, the point card pre-selection unit 12 performs the processing of mapping the information indicating the position of the mobile device 1 to the point card in multiple stages, and the details of this mapping processing will be described later with reference to FIGS. 5 to 9.

The point card storage unit 13 makes and stores a database of point card information in a non-volatile storage device provided locally in the point card management apparatus 1, and supplies, in response to a point card retrieval request from the point card pre-selection unit 12, the retrieved point card information to the point card pre-selection unit 12.

The point card storage unit 13 may be provided in the remote server device 2, or the like, which the point card management apparatus 1 can access via a network, or alternatively the point card storage unit 13 may mirror the database of the point card information stored in the remote server device 2 and hold the mirrored point card information in a non-volatile storage device locally provided in the point card management apparatus 1.

The point card information may include the name of the point card, the ID and password of the user who owns the point card, the name of the store that has issued the point card, the image of the point card, the priority of the point card, the amount of the points, the expiration date of the points, the conditions for using the points, and the like.

The sorting unit 14 sorts the list of the point cards that are pre-selected by the point card pre-selection unit 12.

More particularly, the sorting unit 14 sorts the list of the point cards according to information indicating the user's preference regarding the use of point cards, for example, the priorities of respective point cards, and supplies the sorted list of the point cards to the point card pre-selection unit 12 and the controller unit 15.

The information indicating the user's preference regarding the use of the point card may be generated from the point card usage history accumulated in the point card management apparatus 1, or alternatively, the user may input the desired value regarding the user's preference via the user interface provided by the point card management apparatus 1. For example, the priority of each of the point cards may be automatically calculated based on the number of times the point card concerned is used, which can be obtained from the point card usage history, or alternatively, may be input or changed by the user via the user interface.

The controller unit 15 controls the operation of respective components of the point card management apparatus 1, namely, the position detection unit 11, the point card pre-selection unit 12, the point card storage unit 13, the sorting unit 14, the payment management unit 16, and the point card activation unit 17 in a comprehensive manner to perform respective processing: point card pre-selection processing, point card display and output processing, and point transaction processing, and the like.

The payment management unit 16 detects payments associated with the mobile device 1 along with the purchase of goods or services at stores by users who carry the mobile device 1.

More particularly, the payment management unit 16 may receive a trigger indicating completion of payment from the POS terminal device by communicating with the POS terminal device installed in the store using, for example, NFC (Near Field Communication) or other short-range wireless communication. Alternatively, the payment management unit 16 may communicate with a server device of a financial institution, such as a bank, via a network, and receive a message of a trigger indicating completion of payment by use of a credit card, debit card, or the like, from the server device of the financial institution. Yet alternatively, the payment management unit 16 may also receive the message of the trigger indicating completion of payment via an application for performing payment installed on the mobile device 1.

When the payment management unit 16 receives the trigger indicating the completion of payment, the payment management unit 16 causes the point card activation unit 17 to output the list of point cards, and sets the listed point cards to be available for use.

The point card activation unit 17 displays and outputs the list of point cards to the display screen of the point card management apparatus 1 in response to the trigger of the completion of payment supplied from the payment management unit 16. By selecting a desired point card from the displayed point cards, the user is able to perform point transactions for the selected point card, such as earning points according to the purchase amount, discounting products or services in exchange for points, and obtaining various novelties in exchange for points.

According to the present embodiment, the point card activation unit 17 does not output the generated list of point cards at the time when the point card pre-selection unit 12 generates the list of point cards. Rather, the point card activation unit 17 outputs the list of point cards held at the time of the completion of payment, triggered by the completion of payment for the purchase of goods or services.

For example, assuming that a user is strolling across multiple stores in a large commercial facility such as a shopping mall, the user may not necessarily purchase goods or services at all stores visited by the user, and thus point transactions may not necessarily occur at all stores visited by the user in association with the purchase of goods or services. For this reason, the point card pre-selection unit 12 does not need to output the list of point cards every time the point card pre-section unit 12 generates the list of point cards.

According to the present embodiment, it makes it possible to output a list of only the point cards that can be used at the store where a product or service has actually been purchased and the payment associated with the purchase has been completed. As a result, when a user uses a point card, it makes it possible to narrow down the number of point cards that can be used at the store visited by the user to a number to be sufficiently visible on the display screen.

<Schematic Processing Procedure of Point Card Selection Processing>

Figure 3:
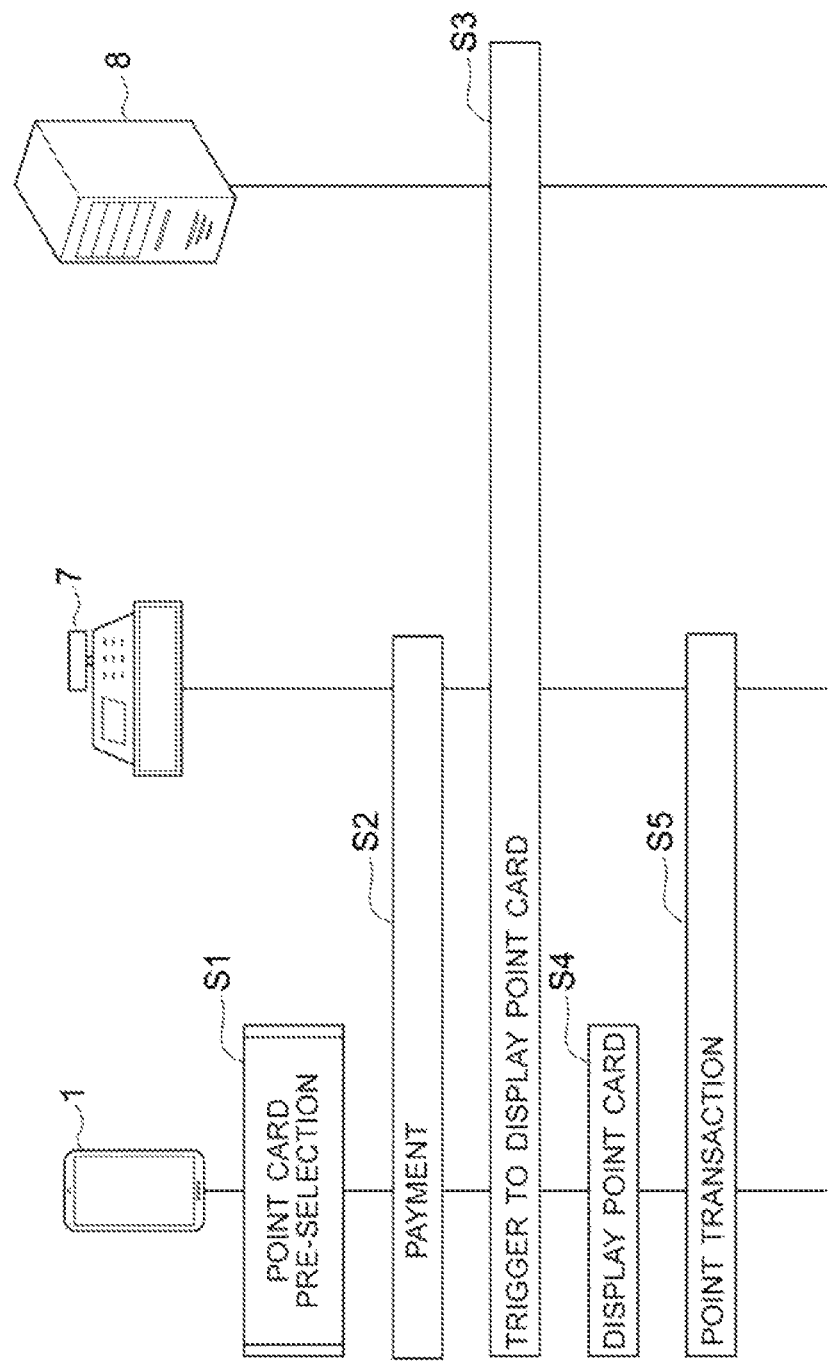
FIG. 3 is a sequence chart illustrating an exemplary schematic processing procedure of point card selection processing performed among the point card management apparatus, a POS terminal device, and a server device of a financial institution.

FIG. 3 is a sequence chart illustrating an exemplary schematic processing procedure of point card selection processing performed among the point card management apparatus (e.g., mobile device), a POS terminal device, and a system of a financial institution such as a bank.

In step S1, the mobile device 1, which serves as the point card management apparatus, performs the pre-selection processing of point cards according to the present embodiment. More particularly, the mobile device 1 detects the position of the mobile device 1 based on signals from one or more of the base station 4, the Wi-Fi access point 5, and the GPS satellite 6, maps the detected information indicating the position of the mobile device 1 to a point card associated with the detected position, retrieves information on the mapped point card from the point card storage unit 13, and generates a list of the retrieved point cards. A list of the retrieved point cards generated in step S1 cards is retained in the temporary storage of the mobile device 1 and awaits a trigger for displaying and outputting.

The mobile device 1 repetitively performs the point card pre-selection processing periodically, for example, every five minutes, to update the list of pre-selected point cards.

Alternatively, the mobile device 1 may perform the point card pre-selection processing triggered by the event that the mobile device 1 moves and thus the received positional information is changed to a different cell ID of a different base stations 4 or a different SSID of a different Wi-Fi access point 5.

The details of the point card pre-selection processing in step S1 performed by the mobile device 1 will be described later with reference to FIG. 4.

In step S2, when a user purchases a product or a service at a store, payment for the purchased product or service is made to the POS terminal device 7 of the store. The mobile device 1 may make a payment by means of an electronic money application running on the mobile device 1, a digitized credit card or debit card, or the like. Alternatively, the user may pay in cash. In either case, the mobile device 1 is able to communicate with the POS terminal device 7 over a short distance, for example, by short-range wireless communication or infrared communication, to make a payment or detect the payment. In other words, the payment of the price of the product or service may be performed in association with the mobile device 1.

In step S3, the POS terminal device 7 at the store communicates with the server device 8 of a financial institution such as a bank or credit card company via the network to notify the execution of payment at the POS terminal device 7. The server device 8 of the financial institution, which has been notified of the execution of the payment, authenticates the electronic money, credit card, or the like, used for the payment, and executes the payment settlement.

Upon execution of the payment settlement, the server device 8 of the financial institution sends a trigger to the mobile device 1 to display and output the list of pre-selected point cards, which is generated in step S1. The server device 8 of the financial institution may send the trigger via the POS terminal device 7 of the store, or alternatively, may directly send the trigger to the mobile device 1. The mobile device 1 receives, via the payment management unit 16, the trigger issued by the server device 8 of the financial institution.

In step S4, upon receipt of the trigger from the server device 8 of the financial institution, the mobile device 1 displays and outputs the list of the point cards that are generated in step S1 and updated on the display screen to make the point cards available for the user. The mobile device 1 performs the display and output processing of the list of point cards by the point card activation unit 17.

The point card activation unit 17 may further narrow down, from the list of point cards pre-selected in step S1, point cards associated with the payment performed in steps S2 and S3, for example, point cards with a benefit such as more points being given by using a predetermined credit card or electronic money for payment, so as to display and output the narrowed down point cards.

In step S5, the user selects the desired point card from the displayed and output list of point cards in step S4, and also specifies the desired point transaction, for example, earning points to the point card, using points, or the like. The mobile device 1 performs the specified point transaction for the point card selected by the user.

<Detailed Processing Procedure of the Point Card Pre-selection Processing>

Figure 4:
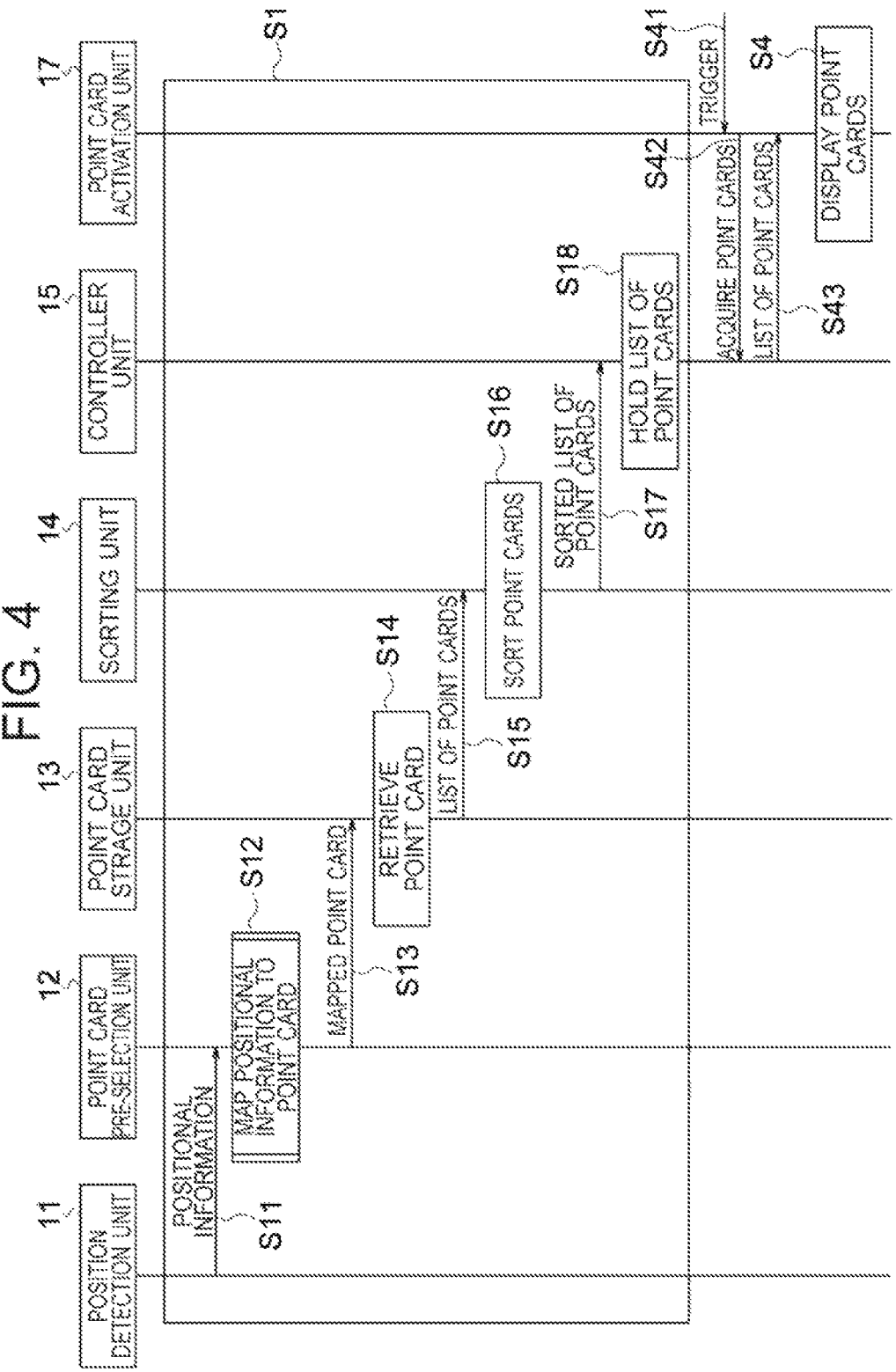
FIG. 4 is a sequence chart illustrating an exemplary detailed processing procedure of point card pre-selection processing in step S1 in FIG. 3.

FIG. 4 is a sequence chart illustrating an exemplary detailed processing procedure of the point card pre-selection processing in step S1 of FIG. 3. Referring to FIG. 4, the processing shown in step S1 is performed by respective components of the mobile device 1, which serves as the point card management apparatus.

In step S11, the position detection unit 11 of the mobile device 1 detects the information indicating the position of the mobile device 1, and supplies the detected information indicating the position of the mobile device 1 to the point card pre-selection unit 12 and the controller unit 15.

More particularly, the position detection unit 11 receives the cell ID broadcast from the base station 4, receives the SSID broadcast from the Wi-Fi access point 5, and detects either of those received cell ID or SSID as the information indicating the position of the mobile device 1.

Alternatively, the position detection unit 11 may measure the position of the mobile device 1 based on the positioning information of the GPS satellite 6 and the transmission time, which have been received from the GPS satellite 6, and detect, as the information indicating the position of the mobile device 1, the measured position of the mobile device 1 (i.e., latitude and longitude).

The positioning information obtained from the GPS satellite 6 is less reliable when the mobile device 1 is located indoors. In particular, when the mobile device 1 is located in a large-scale commercial facility such as a shopping mall, as each of several floors has a different group of stores as tenants, an appropriate selection of point cards depends on the floor on which the mobile device 1 is located. However, it is considered to be difficult to obtain information to identify a certain floor among several floors from the positioning information obtained from the GPS satellite 6.

Furthermore, when using the positioning information from the GPS satellite 6, the positioning information from the GPS satellite 6 is being updated frequently as the mobile device 1 moves. For this reason, when the positioning information from the GPS satellite is being tracked the point card pre-selection processing is being re-run each time the positioning information is updated, it is likely to excessively consume the memory and processor resources of the mobile device 1.

To cope with the above drawback, according to the present embodiment, the mobile device 1 may preferably detect the cell ID broadcast from the base station 4 or the SSID broadcast from the Wi-Fi access point 5 as more accurate information indicating the position of the mobile device 1.

More preferably, when the mobile device 1 is capable of detecting both the cell ID and the SSID, the mobile device 1 may use the SSID preferentially to detect the information indicating the position of the mobile device 1. In recent years, an increasing number of stores have installed dedicated Wi-Fi access points 5. Thus, the SSID, which identifies the Wi-Fi access point 5, is more likely to be mapped to the store name or the name of the point card provided by the store more accurately.

Furthermore, the mobile device 1 may detect the information indicating the position of the mobile device 1 by measuring the altitude of the mobile device 1 from the ground or by analyzing information on the environment around the mobile device 1, including the sound of music (e.g., background music in a store), and temperature, and the like.

In step S12, the point card pre-selection unit 12 of the mobile device 1 maps the information indicating the position of the mobile device 1, which is supplied from the position detection unit 11 in step S11, to the point card associated with the position concerned.

More particularly, the point card pre-selection unit 12 refers to a table for mapping the information indicating the position of the mobile device 1 to point cards, and maps the information indicating the position of the mobile device 1 to the point card associated with the position concerned by performing the mapping processing in multiple steps.

The details of this multi-step mapping processing will be described later with reference to FIG. 5.

In step S13, the point card pre-selection unit 12 of the mobile device 1 retrieves information on the point card that is mapped from the information indicating the position of the mobile device 1 from the information of the point cards in the database stored in the point card storage unit 13.

In step S14, the point card storage unit 13 of the mobile device 1 retrieves the point card information in the database using the point card supplied from the point card pre-selection unit 12 in step S13 as a key.

In step S15, the point card storage unit 13 of the mobile device 1 supplies, as a result of retrieval in S14, the information of the point card mapped in step S12 to the point card pre-selection unit 12 and the sorting unit 14.

In step S16, the sorting unit 14 of the mobile device 1 sorts the information of the point cards, which is the retrieval result supplied from the point card storage unit 13.

More particularly, the sorting unit 14 sorts the list of point cards according to information indicating the user's preference regarding the use of the point cards, for example, the priorities of respective point cards. In this case, the sorting unit 14 may sort the point cards in descending order of priority such that the point cards with higher priority are placed at the top of the list.

In step S17, the sorting unit 14 of the mobile device 1 supplies the list of point cards, which is sorted in step S16, to the point card pre-selection unit 12 and the controller unit 15.

Alternatively, the sorting unit 14 may skip the sorting processing in step S16 when the number of point cards pre-selected in step S12 is less than a predetermined threshold, for example, less than the number that can be listed as a whole on the display screen of the mobile device 1. In this case, the list of point cards supplied from the point card storage unit 13 in step S15 is directly passed on in step S17.

In step S18, the controller unit 15 holds the list of point cards supplied from the sorting unit 14 in step S17, and awaits the reception of the trigger from the POS terminal device 7 or the server device 8 of the financial institution via the payment management unit 17.

The controller unit 15 performs the respective processes from step S11 to step S18 periodically, for example, at five-minute intervals or at ten-minute intervals. The controller unit 15 may also variably adjust the repetition cycle of respective processes from step S11 to step S18 by recording the time when the cell ID or the SSID detected by the mobile device 1 is changed and based on the time interval, for example, until one cell ID or SSID is changed to another cell ID or SSID.

The controller unit 15 may further re-run the processes from step S11 to step S18 when the cell ID or SSID detected by the mobile device 1 is switched to another cell ID or SSID to generate the updated list of point cards.

In step S41, which is subsequent to step S18, the point card activation unit 17 of the mobile device 1 receives the trigger issued upon the completion of payment from an external POS terminal device 7 or a server device 8 of the financial institution via the payment management unit 16.

In step S42, the point card activation unit 17 of the mobile device 1 requests, to the controller unit 15, the list of point cards held in step S18.

In step S43, in response to the request for the list of point cards from the point card activation unit 17, the controller unit 15 of the mobile device 1 supplies the point card activation unit 17 with the list of point cards held in step S18 along with the information of respective point cards.

When acquiring the list of point cards in step S43, in step S4, the point card activation unit 17 of the mobile device 1 displays and outputs the list of point cards on the display screen of the mobile device 1. This allows a user to select a desired point card output in the list on the display screen of the mobile device 1 to perform a desired point transaction using the selected point card.

The point card activation unit 17 may make point cards available by displaying and outputting the list of point cards on the display screen, triggered by the completion of payment, as described above.

The point card activation unit 17 may continue to display the list of point cards while the mobile device 1 is in a predetermined location, for example, within a predetermined SSID receiving range. Alternatively, the point card activation unit 17 may display and output the list of point cards, triggered by an operational event of the mobile device 1 directed to the payment, such as an event that the mobile device 1 is unlocked, that the mobile device 1 is placed or held with the display screen facing up, or that a camera mounted on the mobile device 1 detects a laser beam for barcode scanning directed to the display screen of the mobile device 1.

Furthermore, the point card activation unit 17 may also display and output the list of point cards when the point card activation unit 17 receives any trigger to make the point cars available from other devices via the wireless interface, for example, the Near Field Communication (NFC), Wi-Fi, or Bluetooth (registered trademark), or the like.

Alternatively, the point card activation unit 17 may detect an audio signal or a change in the brightness or color on the display screen of the mobile device 1 to detect the operational event of the mobile device 1 directed to the payment, and acquire the trigger to display and output the list of point cards.

<Two-phase Matching to Point Cards>

Figure 5:
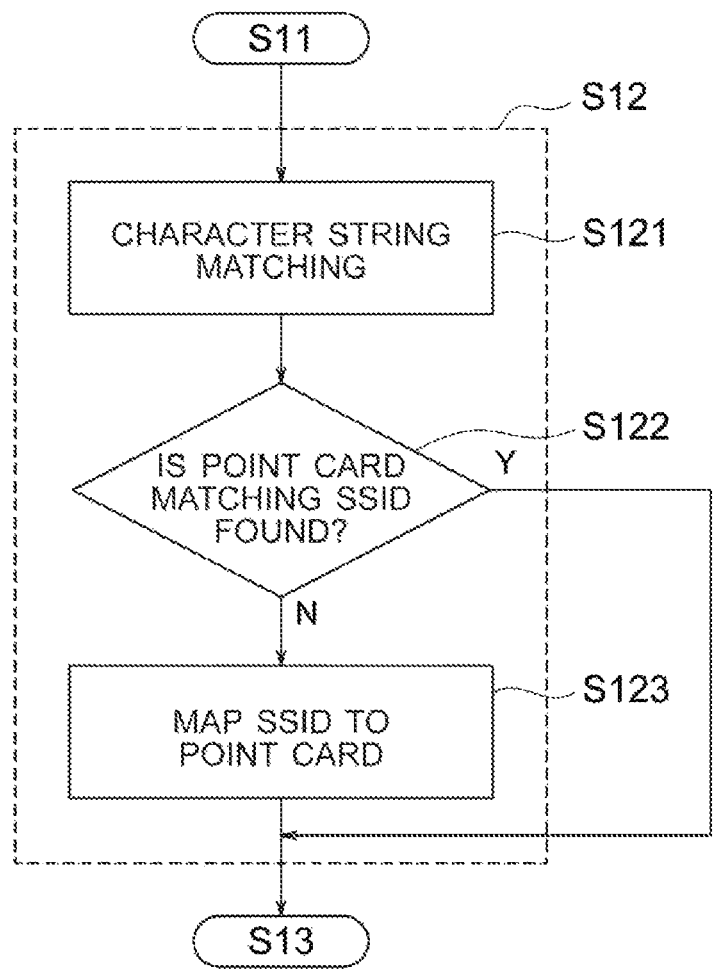
FIG. 5 is a flowchart illustrating an exemplary detailed processing procedure of mapping processing from positional information to a point card in step S12 in FIG. 4.

FIG. 5 is a flowchart illustrating an exemplary detailed processing procedure of the mapping processing from the positional information to a point card in step S12 in FIG. 4.

According to the present embodiment, the point card pre-selection unit 12 of the mobile device 1, which serves as the point card management apparatus, performs the mapping from the information indicating the position of the mobile device 1 to the point card in multiple stages, for example, in FIG. 5, by a first mapping (step S121) and a second mapping (step S123). Hereinafter, a certain example will be described in which the point card pre-selection unit 12 uses the SSID of the Wi-Fi access point 5.

In step S121, the point card pre-selection unit 12 performs character string matching between the SSID detected by the position detection unit 11 and the name of point cards.

More particularly, the point card pre-selection unit 12 compares the character string of the SSID detected in step S11 with the character string of the point card name stored in the point card storage unit 13.

For example, when the SSID "StarBucks" (registered trademark) is detected, it is possible to map the detected SSID to the point card name "StarBucks", which matches the character string of the detected SSID. Similarly, when the SSID "Tokyu" is detected, it is possible to map the detected SSID to the point card name "Tokyu", which matches the character string of the detected SSID.

The point card pre-selection unit 12 may use the SSID as a search string, for example, refer to a list containing a plurality of entries, each of which describing a character string of each point card name, and search for an entry that completely matches or at least partially matches the character string of the detected SSID.

The point card pre-selection unit 12 searches the list of point card names using the SSID as the search string. When a point card name that completely matches the SSID is not found, the point card pre-selection unit 12 may search for a point card name that at least partially matches the SSID from the list of point card names.

For example, when the SSID "Tokyufree_Wifi" is detected, it is possible to map the detected SSID to the point card name "Tokyu point card" which partially matches the character string of the detected SSID. Similarly, when the SSID "Rakuten Mobile" is detected, it is possible to map the detected SSID to the point card name "Rakupoints" which partially matches the character string of the detected SSID.

When the point card pre-selection unit 12 detects a plurality of SSIDs in step S11, in step S121, the point card pre-selection unit 12 may search for a plurality of point cards that match a plurality of SSIDs, respectively.

In step S122, the point card pre-selection unit 12 determines whether or not there is a point card that completely or partially matches the character string of the SSID in step S121.

When a point card that matches the character string of the SSID is found (S122: Y), the point card pre-selection unit 12 may skip step S123 to proceed to step S13.

On the other hand, in S121, which is the first mapping, when a point card that fully or partially matches the character string of the SSID is not found from the list of point card names (S122: N), the point card pre-selection unit 12 proceeds to step S123 to perform the second mapping.

FIG. 6 is a schematic diagram illustrating an exemplary configuration of a mapping table between the store names and the point card names, which is referred to in the second mapping by the point card pre-selection unit 12.

Referring to FIG. 6, assuming that the SSID "Seven Eleven" is detected, the detected SSID matches an entry of the store name "Seven Eleven" in the table in FIG. 6. Therefore, the point card pre-selection unit 12 is able to map the SSID "Seven Eleven" to the point card name "Nanaco" that corresponds to the store name "Seven Eleven". The point card pre-selection unit 12 may search for a store name that partially matches the detected SSID from the table in FIG. 6.

By referring to the mapping table between the store names and the point card names shown in FIG. 6, it makes it possible to map, through the store name, the detected SSID to the point card with a name that does not match the character string of the detected SSID more appropriately.

In general, an SSID of the Wi-Fi access point 5 provided by a store often includes at least partially a name of the store. On the other hand, in a case of mapping of an SSID shared by a plurality of stores, the point card pre-selection unit 12 may be provided with a separate table for mapping the shared SSID to store names. In this case, a single SSID may be mapped to a plurality of store names.

FIG. 7 is a schematic diagram illustrating an exemplary configuration of a mapping table between SSIDs and the point card names, which is referred to by the point card pre-selection unit 12 in the second mapping.

Referring to FIG. 7, assuming that the SSID "SevenEleven_Free_Wifi" is detected, the detected SSID matches an entry of the SSID "SevenEleven_Free_Wifi" in FIG. 7. Therefore, the point card pre-selection unit 12 is able to map the SSID "SevenEleven_Free_Wifi" to the corresponding point card name "Nanaco".

By referring to the mapping table between the SSIDs and the point card names shown in FIG. 7, it makes it possible to map the detected SSID to the point card with a name that does not match the character string of the detected SSID more appropriately.

<Implementing Methods of Mapping Table>

As a first implementing method of the mapping table, the mapping table between the SSIDs and the point card names shown in FIG. 7 may be provisioned from the server device 2 to the mobile device 1, which serves as the point card management apparatus, via a network such as the Internet. In this case, the mobile device 1 may periodically download the mapping table between the SSIDs and the point card names shown in FIG. 7 from the server device 2. Alternatively, the mobile device 1 may download the updated mapping table as a part of the OS or application update routine of the mobile device 1, which implements the point card management apparatus 1.

The server device 2 registers the initial mapping between the SSIDs and the point card names in the mapping table, and subsequently the server device 2 keeps updating the mapping table as a new SSID or a point card is changed or discontinued.

The point card management apparatus 1 refers to the mapping table between the SSIDs and the point card names, which has been downloaded from the server device 2 to the non-volatile storage device of the mobile device 1 in advance, and pre-selects the point cards based on the SSID.

In this case, the series of processes from SSID detection to point card pre-selection in mobile device 1 (steps S11 to S18 in FIG. 4) are completed within the mobile device 1. For this reason, it makes it possible to effectively prevents the information on how many times a certain point card has been used and who has used which point card on a certain mobile device 1 from being tracked or leaked to the outside.

As a second implementing method of the mapping table, the mapping table between the SSIDs and the point card names shown in FIG. 7 may be stored in the server device 2. The mobile device 1, which serves as a point card management apparatus, issues a query to the server device 2 using the detected SSID as a key. The server device 2 may select, by referring to the mapping table, the point card name corresponding to the SSID included in the query, and send the selected point card name to the mobile device 1 that issued the query. The mobile device 1 may maintain a temporary copy of all or a part of the mapping table stored by the server device 2 in a cache of the mobile device 1.

In order to constitute the mapping table shown in FIG. 7 on the server device 2, it is possible to provide a server device 2 that serves as a single proxy server shared by a plurality of stores, and cause each of stores to upload an SSID that identifies each Wi-Fi provided by each store to the single proxy server.

The mobile device 1, which serves as the point card management apparatus, may send the detected SSID to the proxy server, and pre-select the point cards using the point card name sent as a response from the proxy server.

More particularly, the proxy server that is shared by a plurality of stores may operate as a Domain Name Server (DNS). This DNS server may provide a predetermined top-level domain name (e.g., "pointcards.jp") to a plurality of stores and mobile device 1.

The mobile device 1 may use a TXT record, which describes the textual information to be associated with the sources outside the domain, to describe the SSID, and request the DNS server to map the SSID to the point cards.

For example, it is assumed that the mobile device 1 sends a query including the SSID "SevenEleven_Free_Wifi" to the DNS server, and the DNS server sends a response including "nanaco" and "rakupoints", which are the point cards to be mapped to the SSID in the query to the mobile device 1, respectively.

In this case, the mobile device 1 may send the TXT record "TXT SevenEleven_Free_Wifi.pointcards.jp" to the DNS server, and the DNS server, which has received the query, may send a response including "SevenEleven Free_Wifi.pointcards.jp. TXT IN 'cards=nanaco, rakupoints'" to the mobile device 1.

As described above, by issuing the query to the server device 2 using the DNS, it makes it possible to easily acquire the pre-selection results of point cards from the server device 2 without requiring any specific application or protocol between the mobile device 1 and the server device 2. In addition, since the server device 2, which serves as the proxy server, collectively updates the mapping table shown in FIG. 7 to the latest status, it makes it possible to reduce the load of maintaining the mapping table on the mobile device 1, which serves as the point card management apparatus.

As a third implementing method of the mapping table, the mapping table may be generated by automatically inputting data to the mapping table in the mobile device 1, which serves as the point card management apparatus, without the server device 2 intervening.

More particularly, the mobile device 1 tracks how many times each of point cards is selected by the user, in other words, how many times each of point cards is used, along with the SSID of the detected Wi-Fi access point 5, and records the tracking result in a frequency table. The frequency table, as being updated, serves as a table that indicates which SSID is more preferred for which point card.

FIGS. 8A to 8C are schematic diagrams illustrating exemplary processing procedures in which the mobile device 1 serving as the point card management apparatus automatically inputs data into the matching table between the SSIDs and the point card names in FIG. 7, respectively.

FIG. 8A shows an initial state of the frequency table. The controller unit 15 of the mobile device 1 generates the frequency table 81 in the initial state with the SSID, the point card name, and a counter indicating the number of point card transactions as columns.

FIG. 8B shows the frequency table after the point card has been used once. The controller unit 15 of the mobile device 11 records "1" in the counter of the frequency table 82 when a point card transaction using the point card "nanaco" is executed with the SSID "SevenEleven".

FIG. 8C shows the frequency table after a point card has been used x-times. The controller unit 15 of the mobile device 1 updates the frequency table 83 every time a point card transaction is executed by each point card. The frequency table 83 shown in FIG. 8C has seven entries, and the counter value is updated for each combination of the SSID and the point card.

Referring to FIG. 8C, as the number of point card transactions with the SSID "SevenEleven", the counter for the point card "nanaco" is updated 15 times, the counter for the point card "Rakuponts" is updated 10 times, the counter for the point card "Ponta" is updated once, and the counter for the point card "Starbucks" is updated 5 times, respectively.

For example, assuming that the stores SevenEleven and Lawson are in close proximity to each other in a large-scale shopping mall, the Wi-Fi areas of the SSIDs "SevenEleven" and "Lawson" provided by respective stores may overlap, resulting in a possible discrepancy between the detected SSID and the location where the point card transaction is actually executed.

According to the present embodiment, the frequency table allows a plurality of entries of different point card names for a single SSID, and also allows the counter to have the number of point card transactions for each of entries.

The controller unit 15 of the mobile device 1 refers to the frequency table 83, and when a plurality of entries for a single SSID is retrieved, the controller unit 15 of the mobile device 1 may pre-select a point card having an entry with the highest counter value as the point card with the highest probability of being available for the SSID concerned. It makes it possible to map the SSID to the point card with higher accuracy.

Using the frequency table generated as shown in FIGS. 8A to 8C, the mobile device 1 searches the frequency table when the SSID is detected. When there is still no entry in the frequency table, the mobile device 1 awaits until the point card is used, in other words, a point card transaction is executed. When the point card transaction is executed, the mobile device 1 generates an entry for the SSID detected and the point card used, and records 1 in the counter for the generated entry.

On the other hand, if an entry is already registered in the frequency table when the mobile device 1 detects the SSID, the mobile device 1 may sort the entries of the detected SSID in descending order of the counter value, and extract a predetermined number of entries, for example, three, in descending order of the counter value so as to pre-select the point cards of the extracted entries. The pre-selected point cards are displayed and output on the display screen of the mobile device 1, triggered by the completion of payment, and when any of the displayed and output point cards is used and the point card transaction is executed, the controller unit 15 of the mobile device 1 adds 1 to the counter of the used point card.

As described above, according to the present embodiment, the entries of the SSID with small counter values in the frequency table are excluded from pre-selection. For example, referring to FIG. 8C, when the SSID "SevenEleven" is detected, the value of the counter that indicates the number of times the point card transaction for the point card "Ponta" is executed is set to 1. This counter value is smaller than either the counter value 15 of the point card "nanaco" or the counter value 10 of the point card "Rakuponts". In this case, even when the SSID "SevenEleven" is detected, the point card "Ponta" with the smallest counter value is assumed to be the point card erroneously associated with the SSID "SevenEleven" and is excluded from pre-selection. It makes it possible to prevent the wrong point card from being pre-selected more effectively.

It should be noted that the above described first and second mapping table implementing methods are equally applicable to the mapping table between store names and point cards shown in FIG. 6.

As described above, according to the present embodiment, a point card management apparatus digitizes a plurality of point cards issued to a user and stores the digitized point cards in a storage device, pre-selects, from the plurality of digitized point cards, point cards that can be used in the environment in which the mobile device is located according to the position of the mobile device, the user's preferences, the payment status, or the like, and outputs the list of pre-selected point cards to the display screen, triggered by the user's payment for the purchase of a product or service.

As a result, it makes it possible to present available point cards from a large number of digitized point cards stored in the mobile device more expeditiously and automatically.

Modification to Embodiments

Hereinafter, modification to the present embodiments will be described below with reference to FIGS. 9 and 10. According to the present modification, the Wi-Fi access point 5 describes information that identifies the point card in an SSID, which is broadcast as a beacon.

More particularly, according to the present embodiment, the mobile device 1, which serves as the point card management apparatus, receives the SSID, analyzes the received SSID, decodes the information that identifies the point card described in the SSID, and may acquire the point card name that is to be mapped to the SSID. According to the present modification, for example, the SSID itself, which is broadcast as a beacon by the Wi-Fi access point 5 provided by the store, is able to carry information that identifies the point card that can be used in the store concerned.

More particularly, for example, numbers are assigned to all point cards in ascending order, respectively. The corresponding bit in the SSID is assigned to each of point cards.

When a store is about to set a certain point card available, the store just needs to set the appropriate bit in the SSID in order to describe the information that identifies the available point card. For example, such an SSID can be described in the bit representation "00000000 01000000 00000100 00000001 . . . ". The SSID has, for example, 32 octets.

The Wi-Fi access point 5 is capable of broadcasting one or more SSIDs, and when broadcasting a plurality of SSIDs, at least one SSID may contain information identifying the available point cards.

When the mobile device 1, which serves as the point card management apparatus, detects the SSID broadcast via the beacon from the Wi-Fi access point 5, the mobile device 1 may decode the detected SSID to determine which bit of the SSID is set, and pre-select the point cards to be mapped.

Figure 9:
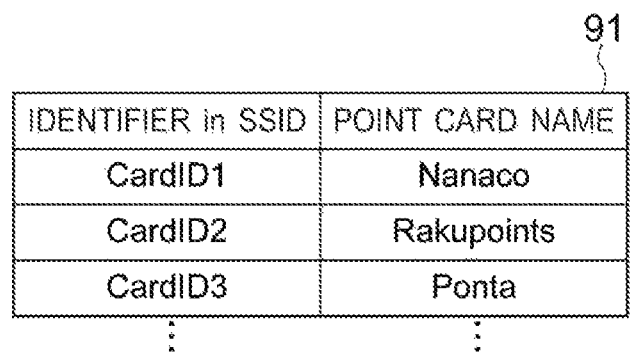
FIG. 9 is a schematic diagram illustrating an exemplary configuration of yet another mapping table between identifiers of point cards described in the SSIDs and the point card names referred to by the point card management apparatus.

FIG. 9 is a schematic diagram illustrating an exemplary configuration of a mapping table between the information identifying the point card described in the SSID referred to by the mobile device 1 and the point card names.

Referring to FIG. 9, the mapping table 91 stores the correspondence between the numbers (i.e., identifiers) represented by the bit string to identify the point cards described in the SSID and the point card names.

The mobile device 1 searches for the point card identification number in the SSID, which is decoded from the detected SSID, from the point card identifiers in the SSIDs (CardID1, CardID2, CardID3 . . . ) in the mapping table 91, and acquires the point card name corresponding to the matched identifier.

An SSID typically has 32 octets, in other words, 32×8=256 bits, thus the maximum number of point cards that can be described by a bit-string pattern in a single SSID is 256.

In case that a large number of point cards are available in a single store, 32 octets of the SSID may be divided into a plurality of segments in order to allow more point cards to be described in a single SSID broadcast from the Wi-Fi access point 5 of the store.

Figure 10:
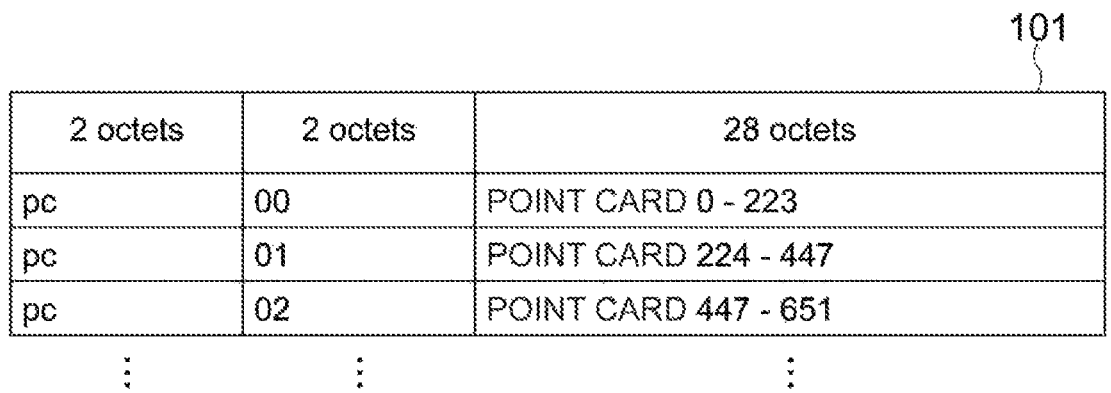
FIG. 10 is a schematic diagram illustrating an exemplary description of the identifier of a point card in the SSID, which is broadcast from a Wi-Fi access point.

FIG. 10 is a schematic diagram illustrating an exemplary description of the point card identifier in the SSID broadcast from the Wi-Fi access point 5. The mobile device 1 may have the segmentation shown in FIG. 10 as a table 101.

Referring to FIG. 10, the first four octets of the SSID indicate that the SSID concerned is being used to broadcast the available point cards. For example, the first two octets may have a value of "pc" indicating that the point card is to be notified, and the subsequent two octets may be used as a counter with values from 00 to FF. The remaining 28 octets of the SSID may identify 224 different point cards from one another using a 224-bit representation for each of 00 through FF.

For example, assuming that a certain store needs to make a point card with the identification number of 2589 available, the Wi-Fi access point 5 of the store may broadcast the SSID in which the first four octets are set to "pc11", and the following 28 octets are the bit string with the $125^{th}$ bit being set.

According to the exemplary SSID description shown in FIG. 10, it makes it possible to expand the number of point cards that can be identified by a single SSID up to 256× 224=57,344.

By using the exemplary SSID description shown in FIG. 10, the point card management apparatus 1 is able to filter out the SSID that carries the information to identify the point card from among the broadcast SSIDs, and perform the point card pre-selection processing solely using the filtered SSID.

Since it is sufficient to analyze only the SSID required for the point card pre-selection processing, it makes it possible to reduce the load of the SSID analysis processing, and display and output the list of point cards to the user with lower latency so as to improve the user experience.

<Hardware Configuration of Point Card Management Apparatus>

Figure 11:
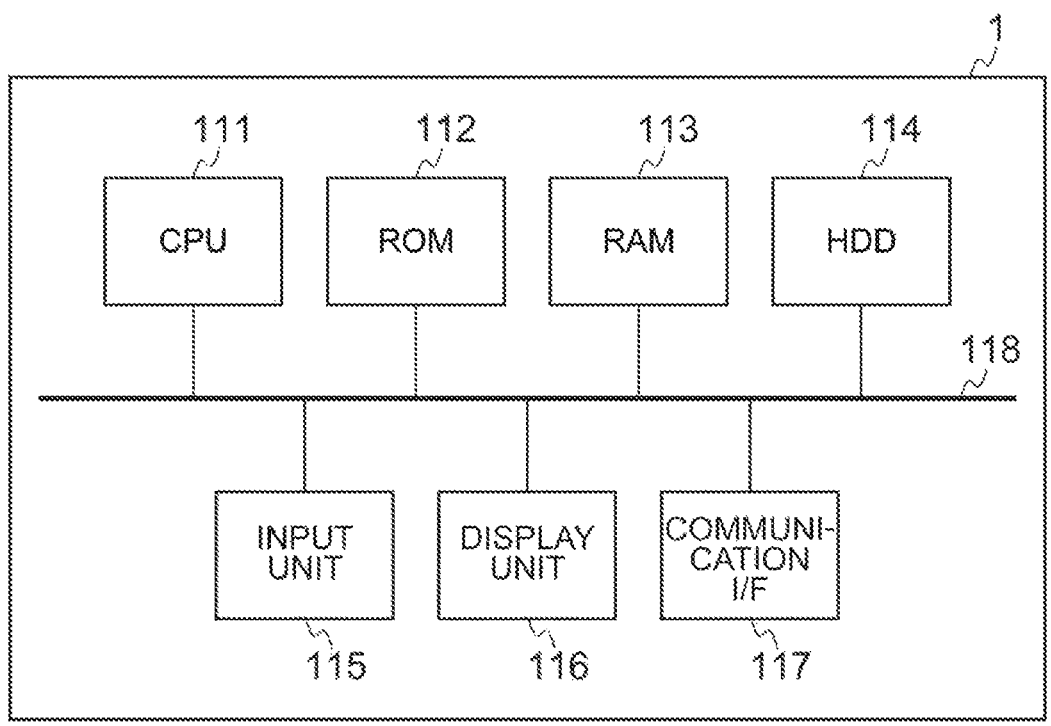
FIG. 11 is a block diagram illustrating an exemplary hardware configuration of the point card management apparatus according to the present embodiments.

FIG. 11 is a block diagram illustrating a non-limiting example of the hardware configuration of the point card management apparatus 1 according to the present embodiment.

The point card management apparatus 1 according to the present embodiment may be implemented in any single or a plurality of computers or any other processing platform as long as the point card management apparatus 1 functions as a mobile device that can be carried by a user.

As shown in FIG. 11, the point card management apparatus 1 may include a CPU 111, a ROM 112, a RAM 113, an HDD 114, an input unit 115, a display unit 116, a communication OF 117, and a system bus 118. The point card management apparatus 1 may also be equipped with an external memory.

The CPU (Central Processing Unit) 111 controls entire operations of the point card management apparatus 1 in a comprehensive manner, and controls the operations of respective components 112 to 117 via the system bus 118, which serves as a data transmission path.

The ROM (Read Only Memory) 112 is a non-volatile memory that stores the control programs and the like necessary for the CPU 111 to execute the processing. Those programs may be stored in a non-volatile memory such as an HDD (Hard Disk Drive) 114, an SSD (Solid State Drive), or removable storage media (not shown).

The RAM (Random Access Memory) 113 is a volatile memory and functions as a main memory, a work area, or the like of the CPU 111. In other words, the CPU 111 loads the necessary programs and the like from the ROM 112 into the RAM 113 and executes the programs to realize various functional operations.

The HDD 114 stores, for example, various data and information necessary for the CPU 111 to perform processing using the programs. In addition, the HDD 114 stores, for example, various data and various information and the like obtained by the CPU 111 performing the processing using the programs and the like.

The input unit 115 is constituted with a pointing device such as a keyboard, a mouse, a capacitive or pressure-sensitive touch panel, or the like.

The display unit 116 is constituted with a monitor such as a liquid crystal display (LCD). The display unit 116 may provide a GUI (Graphical User Interface) that is used to input instructions to the point card management apparatus 1 for various parameters used in the point card selection processing or the like, communication parameters used in communication with other devices, or the like.

The communication IN 117 is an interface that controls communication between the point card management apparatus 1 and external devices.

The functions of at least some of the components of the server management apparatus 1 shown in FIG. 2 may be realized by the CPU 111 executing the programs. However, at least some of the functions of the components of the point card management apparatus 1 shown in FIG. 2 may be operated by a dedicated hardware. In this case, the dedicated hardware operates based on the control of the CPU 111.

Although certain embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

REFERENCE SIGNS LIST

1: Point Card Management Apparatus (Mobile Device); 2: Server Device; 3: Mobile Network; 4: Base Station; 5: Wi-Fi Access Point; 6: GPS Satellite; 7: POS Terminal Device; 8: Server Device of Financial Institute; 11: Position Detection Unit; 12: Point Card Pre-selection Unit; 13: Point Card Storage Unit; 14: Sorting Unit; 15: Controller Unit; 16: Payment Management Unit; 17: Point Card Activation Unit; 111: CPU; 112: ROM; 113: RAM; 114: HDD; 115: Input Unit; 116: Display Unit; 117: Communication I/F; 118: System Bus

What is claimed is:

1. An information processing apparatus, comprising:
   at least one memory configured to store program code; and
   electric circuitry including at least one of a field programmable gate array (FPGA), an application specific integrated circuit (ASIC), and at least one processor, the at least one processor being configured to read and operate according to the program code, the electronic circuitry configured to:
   detect a position of the information processing apparatus, wherein the information processing apparatus is indoors;
   determine, from a plurality of point cards stored in advance in the information processing apparatus, a second plurality of point cards based on the position of the information processing apparatus;
   determine a priority of each of the second plurality of point cards based on a point transaction history of the point cards, and sort the second plurality of point cards in order of the determined priority;
   control processing of detecting the position and determining the second plurality of point cards to periodically repeat;
   display, on the display screen of the information processing apparatus, a user interface including each of the second plurality of point cards sorted in order of the determined priority;
   receive a selection of a point card from among the second plurality of point cards;
   detect payment associated with the information processing apparatus; and
   output the selected point card, triggered by the detected payment;
   wherein detecting the position includes detecting an SSID (Service Set Identifier), wherein the SSID includes an identification of a third plurality of point cards, wherein based on the information processing apparatus being able to detect both a cell ID broadcast from a base station corresponding to a mobile network associated with the information processing apparatus and an SSID broadcast from a Wi-Fi access point, the information processing apparatus uses the SSID to detect the information indicating the position of the information processing apparatus; and
   wherein determining the second plurality of point cards is based on the third plurality of point cards.

2. The information processing apparatus according to claim 1, wherein
   detecting the position detects the cell ID distributed from the base station, and
   determining the point card selects, when the detected cell ID is switched, at least one point card associated with a destination cell ID to be switched.

3. The information processing apparatus according to claim 1,
   wherein
   outputting outputs a point card associated with the detected payment from among the selected point cards.

4. The information processing apparatus according to claim 1,
   wherein
   detecting the payment receives a message indicating a completion of payment sent from an external device connected to the information processing unit via a network, and
   outputting outputs the selected point card, triggered by the received message.

5. An information processing method performed by an information processing apparatus, comprising steps of:
   detecting a position of the information processing apparatus, wherein the information processing apparatus is indoors;
   determining, from a plurality of point cards stored in the information processing unit in advance, a second plurality of point cards based on the detected position of the information processing apparatus;
   determining a priority of each of the second plurality of point cards based on a point transaction history of the point cards, and sorting the second plurality of point cards in order of the determined priority;
   controlling processing of detecting the position and determining the second plurality of point cards to periodically repeat;

displaying on the display screen of the information processing apparatus, a user interface including each of the second plurality of point cards sored in order of the determined priority;
receiving a selection of a point card from among the second plurality of point cards;
detecting payment associated with the information processing apparatus; and
outputting the selected point card, triggered by the detected payment;
wherein detecting the position includes detecting an SSTD (Service Set Identifier), wherein the SSID includes an identification of a third plurality of point cards, wherein based on the information processing apparatus being able to detect both a cell ID broadcast from a base station corresponding to a mobile network associated with the information processing apparatus and an SSID broadcast from a Wi-Fi access point, the information processing apparatus uses the SSIB to detect the information indicating the position of the information processing apparatus; and
wherein determining the second plurality of point cards is based on the third plurality of point cards.

6. An information processing computer program product for causing a computer of an information processing apparatus to execute information processing, the computer program product causing the computer to execute processing comprising:
detecting a position of the information processing apparatus, wherein the information processing apparatus is indoors;
determining, from a plurality of point cards stored in advance in the information processing apparatus, a second plurality of point cards based on the position of the information processing apparatus detected by the position detection process;
determine a priority of each of the second plurality of point cards based on a point transaction history of the point cards, and sort the second plurality of point cards in order of the determined priority;
periodically repeating the position detection and the determination of the second plurality of point cards;
displaying, on the display screen of the information processing apparatus, a user interface including each of the second plurality of point cards sorted in order of the determined priority;
receiving a selection of a point card from among the second plurality of point cards;
detecting payment associated with the information processing apparatus; and
outputting the point card, triggered by the detected payment;
wherein detecting the position includes detecting an SSID (Service Set Identifier), wherein the SSID includes an identification of a third plurality of point cards, wherein based on the information processing apparatus being able to detect both a cell ID broadcast from a base station corresponding to a mobile network associated with the information processing apparatus and an SSID broadcast from a Wi-Fi access point, the information processing apparatus uses the SSID to detect the information indicating the position of the information processing apparatus; and
wherein determining the second plurality of point cards is based on the third plurality of point cards.

\* \* \* \* \*